United States Patent [19]

Ingalls

[11] 4,109,362
[45] Aug. 29, 1978

[54] METHOD OF MAKING SCREW ROTOR MACHINE ROTORS

[75] Inventor: Robert A. Ingalls, Springfield, Vt.

[73] Assignee: Joy Manufacturing Company, Pittsburgh, Pa.

[21] Appl. No.: 791,366

[22] Filed: Apr. 27, 1977

Related U.S. Application Data

[60] Division of Ser. No. 645,981, Jan. 2, 1976, Pat. No. 4,053,263, which is a continuation of Ser. No. 374,032, Jun. 27, 1973, abandoned.

[51] Int. Cl.² .............................................. B23P 15/00
[52] U.S. Cl. .................................. 29/156.4 R; 29/407; 51/105 HB; 51/287; 90/4
[58] Field of Search ................ 29/159.2, 156.4 R, 407; 51/105 HB, 287; 90/4; 418/197, 201, 202, 203; 74/458, 462

[56] References Cited

U.S. PATENT DOCUMENTS

| | | | |
|---|---|---|---|
| 1,412,889 | 4/1922 | O'Brien | 418/201 |
| 2,462,924 | 3/1949 | Ungar | 74/466 |
| 2,652,192 | 9/1953 | Chilton | 90/4 X |
| 3,247,736 | 4/1966 | Roth | 74/462 |
| 3,314,598 | 4/1967 | Lysholm | 418/201 |
| 3,414,189 | 12/1968 | Persson | 418/201 |
| 3,423,017 | 1/1969 | Schibbye | 418/201 |
| 3,773,444 | 11/1973 | Koch | 418/201 |
| 3,787,154 | 1/1974 | Edstrom | 418/201 |

Primary Examiner—Victor A. Dipalma
Attorney, Agent, or Firm—Arnold B. Silverman

[57] ABSTRACT

Screw rotors for a screw compressor or expander incorporating improved screw profiles on both male and female rotors wherein certain mating portions of the two rotor screws have involute profiles to provide conjugate action of these screw portions with minimum sliding motion of such mating portions and with the remaining non-involute screw portions having generally circular arc profiles so that gear cutting and measuring techniques can be used in the production of such screw rotors.

8 Claims, 3 Drawing Figures

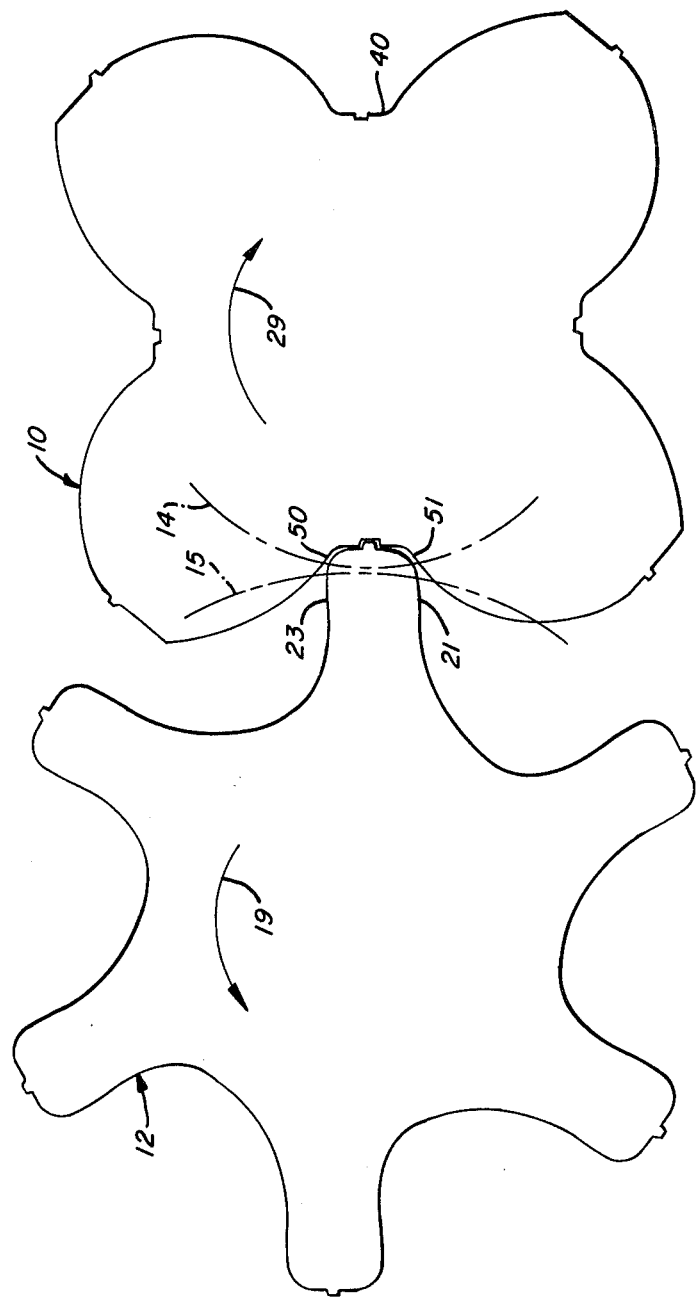

METHOD OF MAKING SCREW ROTOR MACHINE ROTORS

This is a division of application Ser. No. 645,981 filed Jan. 2, 1976, now U.S. Pat. No. 4,053,263 which is a continuation of application Ser. No. 374,032 filed June 27, 1973, now abandoned.

The present invention relates to pairs of rotors for a screw rotor machine for compression or expansion of an elastic working fluid, such as those described and shown in the following U.S. Patents assigned to Svenska Rotor Maskiner: U.S. Pat. Nos. 3,073,513, 3,088,659, 3,073,514, 3,102,681, 3,074,624, 3,129,877, 3,084,851, 3,245,612, 3,088,656, 3,423,017, under which the assignee of this invention is licensed to build such machines.

A screw rotor machine comprises generally a casing provided with a working space having high pressure and low pressure ports and including at least two intersecting bores of parallel axes, and cooperating rotors of male and female type provided with helical lands and intervening grooves with a wrap angle of less than 360°. A male rotor is a rotor in which each land and groove has at least its major portion located outside the pitch circle of the rotor and has two generally convex flanks located outside the pitch circle, while the female rotor is a rotor in which each land and groove has at least its major portion located inside the pitch circle of the rotor and has two generally concave flanks located inside the pitch circle of the rotor.

In the above cited and other patents many and various screw profiles have been proposed and in the later of the listed patents many and various shortcomings of the earlier profiles have been pointed out. Certain of the proposed profiles have been used widely in the field of compression and expander operation without however overcoming all of the objections and particularly an objection not mentioned in any of the earlier patents known to the present inventor, namely the disadvantage resident in the difficulty of producing and measuring surfaces having profiles of generated curves as required by the latest and best screw profiles to be found in the above mentioned patents.

The present invention is directed to profiles based on involute curves producible on standard gear cutting machinery rather than the special Holroyd thread milling machines which must be used to produce such generated surfaces. Besides the difficulty of manufacturing such surfaces it is even more difficult to measure them accurately with the result that we are heavily dependent upon the accuracy of cutter grinding and the correctness of the Holroyd set up. One particularly important disadvantage of the inability to completely check the rotors resides in the necessity of mating a female rotor with a particular male rotor and maintaining such mating through stocking and assembling procedures as well as the necessity for replacing both rotors should one be damaged.

Both the male and female rotor profiles of this invention combine circular arc and involute curves with the result that not only can these new profiles be produced on standard gear cutting or hobbing equipment but by making use of the base line principle as applied to an involute helicoidal tooth form a milling cutter or grinding wheel inclined at the base helix angle and presenting a flat surface to the work will generate the involute helicoid on a rotating part as it advances by the cutter or wheel at a uniform rate. Because of this possibility it is possible to make and finish hardened rotors to be used as masters against which further production can be checked.

Other advantages of the proposed lobe profiles include:

(1) The effective area of male rotor lobes is slightly greater than on existing rotors which should result in increased air flow.

(2) The proposed profile lends itself well to generating by hobbing, rack wheel grinding or other methods which utilize the basic rack as a cutting tool.

(3) All theoretical inter rotor contact points are located on involute lobe surface portions and can be easily calculated using involute trigonometry.

(4) The proportions of all the proposed rotor lobes can be accurately measured using both the normal lobe thicknesses at the base circle and micrometer measurements over precision balls.

(5) Rotors having the profiles set forth by this invention can be manufactured and inspected on a production basis. This will eliminate matching of rotors and reduce cost of manufacture and stock maintenance.

It is therefore an object of this invention to provide a new and improved screw rotor machine.

It is a further object of this invention to provide a new and improved screw rotor machine having rotor profiles producible by hobbing, rack wheel grinding or other tool methods using a basic rack as a generating tool.

These and other objects and advantages of this invention will become more readily apparent upon consideration of the following description and drawings in which:

FIG. 3 is a cross section taken on the plane of rotation of a pair of rotors constructed according to the principles of this invention.

Figure 1:
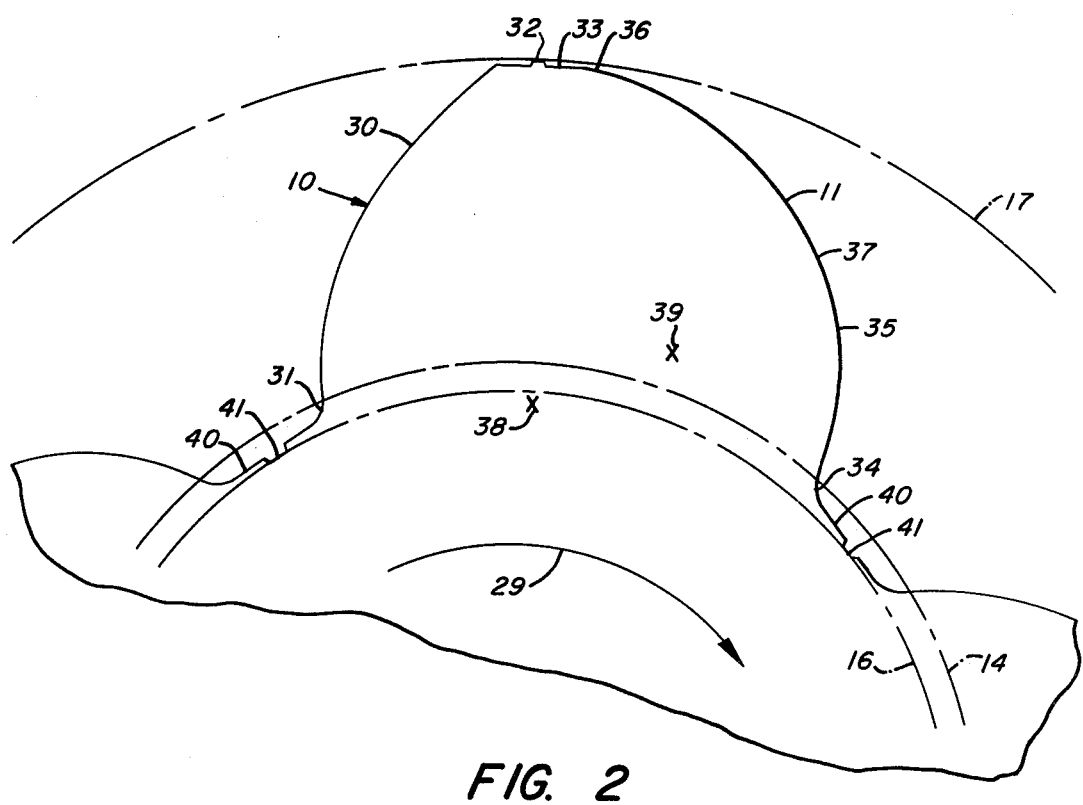
FIG. 1 is a fragmentary cross sectional view taken on the plane of rotation of a male rotor constructed according to the principles of this invention.
Figure 2:
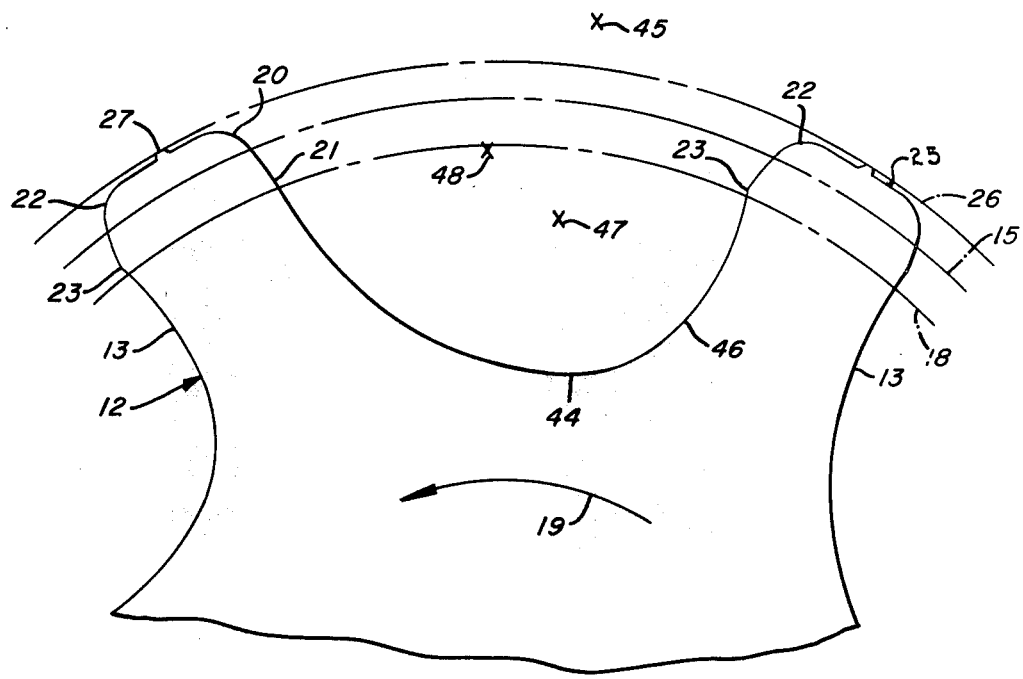
FIG. 2 is a fragmentary cross sectional view taken on the plane of rotation of a female rotor constructed according to the principles of this invention.

In FIGS. 1 and 2 there are shown profiles of rotor lobes generally indicated at 10 and 12 respectively and comprising respective cross sectional outlines of a male and female rotor taken on the plane of rotation. Such profiles according to the principles of this invention are best described by outlining the method by which such profiles may be developed. The main parameters of the compressor are decided upon, as for instance the outside diameter of the rotors and the center distance therebetween. The pitch diameters of male and female rotors are calculated and the related root diameters are derived from the relationship to the outside diameters of the mating rotors after which the principles of this invention are applied.

It having been decided to use the well developed principles and techniques of involute gearing for the above outlined reasons and a pressure angle of 20° having been decided upon, the respective base circle diameters, equal to the respective pitch diameters times the cosine of the pressure angle, are determined and the respective pitch and base circles drawn as indicated on the figures. The numerals 14 and 16 indicate the pitch circle and base circle, respectively, of the male rotor and numerals 15 and 18 indicate the pitch circle and base circle respectively of the female rotor. The lobe thickness of the female rotor on the pitch circle having been determined for sufficient thickness of female lobe to provide adequate thermal conductivity and mechanical strength to avoid deformation by the forces of compression, involute arcs are constructed using the base circle 18 of the female rotor. These arcs are spaced apart along the pitch circle by the desired lobe thickness and extend inwardly from slightly outside pitch circle 15 to slightly outside base circle 18 as from points 20 to 21 on the trailing edge of the female lobe (direction of rotation shown by an arcuate arrow 19) and as from points 22 to 23 on the leading edge of that same lobe to begin formation of the desired profile. Since it has already been decided that there will be six female lobes and four male lobes in the desired configuration there will of course be other identical lobes of the female rotor at 60° intervals all the way around the circle. The outer surface of each female lobe as at 25 is formed at the outside diameter circle 26 afterward being very slightly reduced below that diameter by removal of enough surface to leave a slightly raised sealing strip as at 27.

The male lobe is begun in a somewhat similar fashion. An involute curve, trailing edge 30 (direction of rotation shown by an arcuate arrow 29) developed from the base circle 16 of the male rotor, is constructed from a point 31 slightly inside the pitch circle 14 to a point 32 substantially at the outside diameter circle 17 of the male rotor excepting only that a flat surface 33 similar to the outer surface 25 of the female rotor is developed by flattening of the outer surface of the male lobe to provide a slightly raised sealing strip 32 in a similar manner.

The thickness and spacing of the female lobes having been determined, the thickness of the male lobe 11 at the pitch line has therefore been determined and starting from this point an involute surface curved in the reverse direction from surface 30 is developed from point 34 slightly inside the pitch circle 14 to point 35 a substantial distance above the pitch circle.

Since it has been decided that there will be four male lobes in the rotor 10 and since the lobe thickness at the pitch line is now known it is possible by indexing the drawing to develop the trailing edge and base portion of the leading edge of all four lobes of the male rotor 10. It is now possible, by rotating the female rotor and in view of the known height of the male lobes using a true radius portion, as from point 21 to point 44, to generate the profile of the male rotor lobe 11 from a point 36 at the leading end of the flat surface 33 to the point 35 at the outer end of the desired involute portion of the lobe 11. This will fill the envelope described by the true radius portion 21 to 44 of the lobe 12 of the female rotor. Such a generated curve, however, being an epicyclic shape is impossible to dimension and so, using points on the generated curve, a center is found as at 38 which will provide a circular arc from point 36 to point 37 which closely approximates the generated surface while at the same time providing the advantages of a circular profile surface in being dimensionable and easily machined and checked as well as avoiding the formation of pockets in cooperation with the female rotor.

A short portion of the leading edge of the rotor lobe 11 does not lend itself to production by use of the center 38 and it has been found possible, by standard techniques, to provide the center 39 from which the portion of the leading edge of the lobe 11 can be described from point 37 to point 35. The outside diameter portion of the female rotor as at 27 and at 25 together with the known center distance provides the dimensioning for root surface 40 of the male rotor 10 with a notch 41 matable with the sealing strip 27 cut into each root surface 40 to provide the best possible sealing between the cooperating rotors. (See FIG. 3)

The remaining portion of the profile of the female rotor 12 is developed in a similar fashion in that points on the lobe 11 of the male rotor 10 are used to generate a surface extending from point 23 to point 44 completing the groove of the female rotor 12. However, the same objection to generated surfaces being applicable at this point, arcs of circles are fitted together to closely approximate the generated surface and yet be readily machinable, measurable and otherwise more desirable than the generated epicyclic curve normally used for this portion. The portion of the profile from point 21 to point 44 is an arc based upon a center 45 outside of the O.D. circle 26 found by the usual method of using three points on the desired curve to determine the center 45. In like manner the part of the surface from point 44 to point 46 is produced as an arc of a circle based on center point 47, while the portion of the curve from 46 to 23 is based on the center point 48 in the same manner.

It is to be noted that the ends of involute curves as at points 31 and 34 (male) and 20 and 22 (female) are joined to the concentric portions 40 and 25, respectively by suitable circular arc portions to avoid undesirable sharp changes in direction at any point on the surfaces.

Thus, both of the rotors are completely described without recourse to epicyclic surfaces and all of these surfaces are producible by simple machining procedures and checkable for accuracy of production in a manner not possible with generated surfaces.

Referring to FIG. 3 it is to be noted that the points of nearest engagement as at 50 and 51 of the rotors 10 and 12 are very near the pitch circles 14 and 15 of the respective rotors and, with the knowledge that the engagement of pitch circle points of two mated involute surfaces is a rolling engagement and that all of the surfaces near the pitch circles are nearly so related it will be realized that the engagement of one rotor of this invention with the other is essentially rolling engagement where the surfaces most nearly approach each other so that even should such surfaces touch as may happen under certain circumstances no damage is likely to result because the surfaces are moving only very slowly if at all relative to each other. Such conjugate action is one of the advantages of the rotor design of this invention.

Since according to the nature of involute curves a section tangent to the base circle is a straight line it is possible to produce the rotors of this invention by hardening and grinding to make lasting master rotors against which production rotors can be mated and matched to provide standard rotors without the necessity for making mated pairs as in prior art production.

It is to be further appreciated that although the profiles shown and described above are only generally described yet every point on these profiles is reproducible according to the method outlined regardless of the particular size of rotors desired. It is of course possible to use the same method and principles to develop rotors of more or less than the stated number of lobes as well as using other pressure angles pitch diameters and center distances as may be desired.

A preferred embodiment of the principles of this invention having hereinabove been described and shown in the figures other applications and variations on the particular design are contemplated and expected and a broad interpretation of the principles of this invention limited only by the claims herein attached is requested.

What is claimed is:

1. A method of producing a male rotor for a screw rotor machine comprising:

hobbing a rotor blank to produce an elongated formed male rotor rotatable about a central longitudinal axis and having a pitch circle centered on such axis and a plurality of elongated helical lobes extending longitudinally of said rotor and circumferentially spaced about said pitch circle so as to provide intervening grooves therebetween with a major portion of each of said lobes extending generally radially outward from such pitch circle with the profile of each of said lobes in a plane perpendicular to such axis having a tip portion and respective generally convex leading and trailing flank portions extending intermediate said tip portion and the root portion of the respective adjacent groove; and forming of said hobbing process the profile of said leading flank portion of involute curvature extending between said respective root portion and an intermediate point and traversing said pitch circle, and a circular arc portion extending between said intermediate point and said tip portion with said circular arc portion formed of at least two circular arcs of different radii, and the profile of said trailing flank consisting of involute curvature extending between the other of said respective root portions and said tip portion and traversing said pitch circle.

2. The method of claim 1 including after producing said male rotor through said hobbing, checking said male rotor by mating it with a master rotor.

3. The method of claim 2 including producing said master rotor by material detaching work on a hardened steel blank and measuring involute portions of said profile of said master rotor by use of gear measuring procedures and measuring other portions of said master profile by measuring over precision balls.

4. The method of claim 1 including forming said circular arcs with centers on different points and joining said arcs end to end at the points of mutual tangency.

5. A method of producing a female rotor for a screw rotor machine comprising:

hobbing a rotor blank to produce an elongated formed female rotor rotatable by a central elongated axis and having a pitch circle centered on such axis and a plurality of elongated helical lobes extending longitudinally of said rotor and circumferentially spaced about said pitch circle so as to provide intervening grooves therebetween with a major portion of each of said lobes extending generally radially inwardly of said pitch circle, and the profile of each of said lobes in a plane perpendicular to said axis having a tip portion and respective generally concave leading and trailing flank portions extending intermediate said tip portion and the root portion of the respective adjacent groove; and forming by said hobbing process the profiles of each of said leading and trailing flank portions of involute curvature extending between said tip portion and respective intermediate point and traversing said pitch circle with a circular arc portion extending between said respective intermediate point and the root portion of said respective adjacent groove and said circular arc portion consisting of at least two circular arcs of different radii.

6. The method of claim 5 including after producing said male rotor through said hobbing process, checking said female rotor by mating it with a master rotor.

7. The method of claim 6 including producing said master rotor by material detaching work on a hardened steel blank and measuring involute portions of said profile of said master rotor by use of gear measuring procedures and measuring other portions of said master profile by measuring over precision balls.

8. The method of claim 7 including forming said circular arc with centers on different points and joining said arcs end to end at the points of mutual tangency.

* * * * *

UNITED STATES PATENT OFFICE
CERTIFICATE OF CORRECTION

PATENT NO. : 4,109,362
DATED : August 29, 1978
INVENTOR(S) : Robert A. Ingalls

It is certified that error appears in the above-identified patent and that said Letters Patent are hereby corrected as shown below:

Claim 1, line 22 after the word "forming" delete "of" insert --by--

Signed and Sealed this

Eighteenth Day of September 1979

[SEAL]

Attest:

Attesting Officer

LUTRELLE F. PARKER
Acting Commissioner of Patents and Trademarks